Patented Dec. 5, 1939

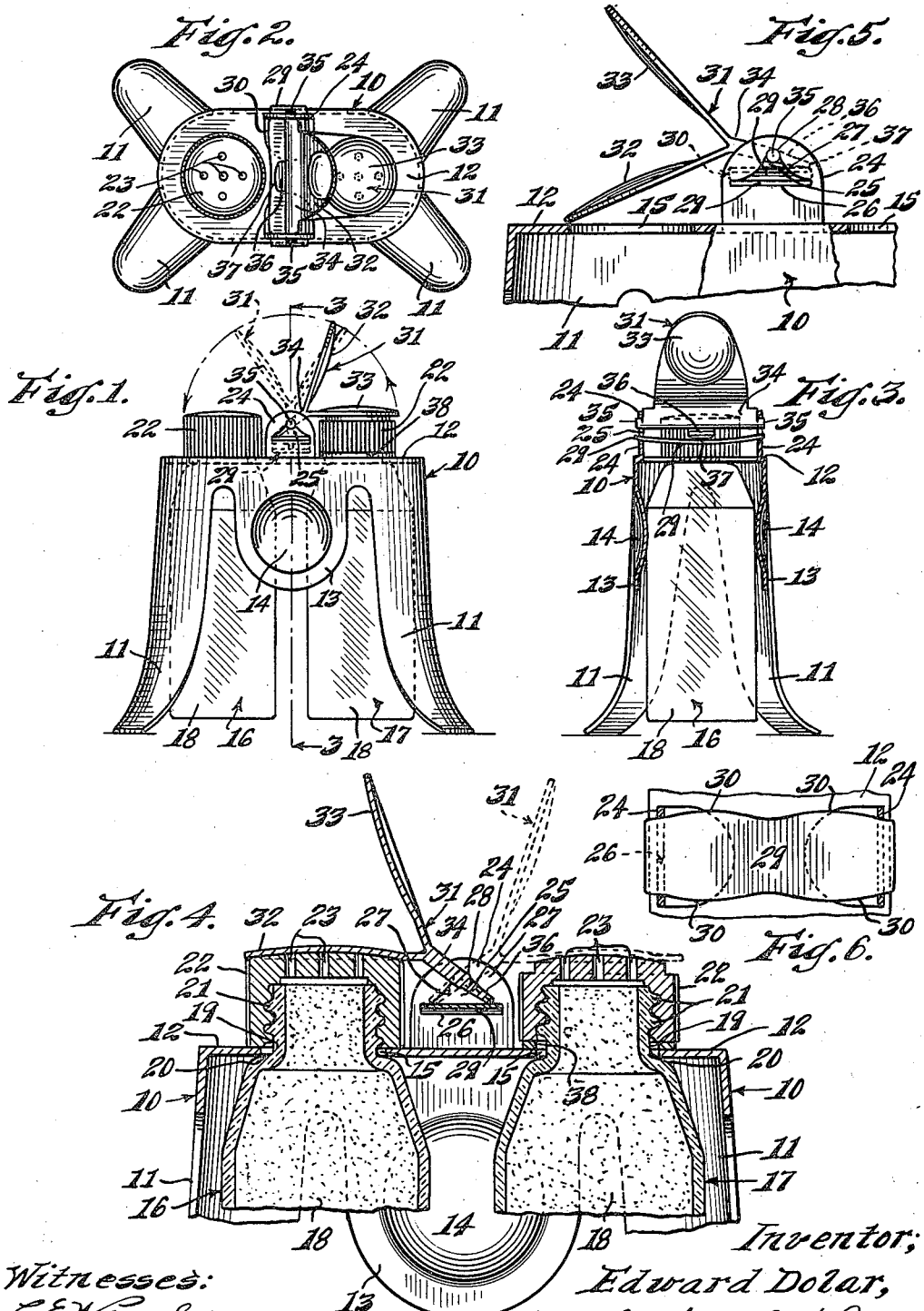

2,182,622

UNITED STATES PATENT OFFICE 2,182,622

CONDIMENT HOLDER

Edward Dolar, Berwyn, Ill.

Application February 4, 1938, Serial No. 188,626

13 Claims. (Cl. 65—45)

This invention relates to improvements in holders or containers of various kinds. More specifically it relates to improvements in salt and pepper shakers so as to provide improved means for holding a plurality of containers in a holder and permitting the contents of one container to be shaken out without shaking out the contents of another, and for shaking out the contents of a plurality of containers.

I am aware that there has been a number of patents issued on closure elements for closing off the contents of one container so as to permit shaking out the contents of another. I am also aware that a number of these patents disclose spring operated devices of various kinds. However, all of these constructions are attended by disadvantages as has been demonstrated when these devices have been put to actual use.

An object of my invention has been to provide a spring operated device for closing off a container or which may permit shaking of a number of containers wherein the means will be simple and yet operated surely, quickly and effectively and be free from the disadvantages attending the previous devices.

Another object of my invention has been to provide a holder of the kind described made with the fewest possible parts, and in accomplishing the objects of my invention I have been able to provide a holder made substantially in three parts, to wit, a holder and a closure element and a spring for operating said closure element. The device of my invention has not only increased effectiveness over the previous holders but is comparatively inexpensive to manufacture.

Other objects and advantages will become apparent and will be brought out more fully in the following specification, reference being had to the accompanying drawing, wherein:

Fig. 1 is a side elevation of the device;

Fig. 2 is a top plan view;

Fig. 3 is a section taken on the line 3—3 of Fig. 1;

Fig. 4 is a partial vertical section;

Fig. 5 is a fragmentary view somewhat similar to Fig. 4, the shaker having been removed, and Fig. 6 is a plan view of the locking spring used to lock the closure element of the device in a desired position.

Referring to the drawing and particularly to Fig. 1 in which I have shown the preferred form of my invention selected for the purpose of illustrating the principles thereof, I show a pepper and salt holder 10 having four flared curved legs which are integrally formed with a horizontal supporting plate 12. Depending from the plate 12 are a pair of thumb plates 13 having recesses 14 to provide easy means for grasping the holder.

For the purpose of securing salt and pepper shakers in the holder there is provided a pair of spaced apertures 15 in the supporting plate 12, there being shown for purposes of illustration a salt shaker 16 and a pepper shaker 17. These shakers are alike and each comprises a glass container 18 in the form shown with a reduced neck 19 providing a shoulder 20 to engage or abut the bottom face of the plate 12 and limit the upward displacement of the containers 18 when inserted in the apertures 15 from beneath the flared holder. The neck has threads 21 to receive a knurled threaded cap 22 having the usual perforations 23. The annular bottom edges of the caps engage the top face of the plate 12 to tightly clamp the containers in position in spaced relation.

Thus far I have described the holder and shakers. In addition to these I have provided a closure element for closing off the salt and pepper or other material as the case may be. This closure element is mounted on the plate 12 which has a pair of ears 24 struck up therefrom, as clearly shown in Figs. 1, 2, 3, 4 and 5. Each ear is provided with substantially triangular slots 25 with the apices centrally at the top having flat bottoms 26, concave sides 27 and rounded upper bearing corners 28 at the top apices. Thus far the structure described, excepting for the salt shakers, is integral in the form shown.

Adapted to be located in the slots 25 in the ears 24, is a flat bow spring 29, the spring being adapted to rest on the flat bottoms 26 of the slots. This spring as will be more clearly apparent hereinafter is adapted to lock the closure element, hereinafter to be described, in a desired position. This spring is clearly shown in Fig. 6. The spring, as may be seen in Fig. 6 is provided on each side of the intermediate point or center of its length with rounded enlargements 30, which enlargements are larger than the slots 25 so that the enlargements are adapted to position the spring with respect to the ears 24 and to prevent the spring from working its way out of the slots in an endwise manner.

The closure element 31 is in general Y-shaped and has a concaved salt cover 32 and a concaved pepper cover 33 merged or integrally formed with a central bar 34 extending away from the covers or wings 32 and 33 in a plane bisecting the angle between said covers, which angle is preferably an acute angle so as to form a V and cause the covers to partially overlie the caps 22 when in an intermediate position. The bar is supported in the ears by means of trunnions or pivot pins 35 formed on and extending from the ends of the bar and which are seated in the rounded upper bearing corner 28. The bar 34 is provided preferably intermediately of its length with a downwardly extending locking lug 36 having a rounded lower surface 37, illustrated in Figs. 2 and 3. If desired, a washer 38 may be used in mounting the shakers in the holder.

It will be understood that in assembling the device, for instance, the glass container for salt may have its neck inserted up through one of the apertures 15 in the holder and its cap may be screwed down on the neck against the plate 12 to secure the shaker in place, as will be readily understood. After both the shakers are secured in place, when it is desired to use the device it will be understood that the holder may be conveniently grasped between the thumb and forefinger of the hand and the thumb recesses. If it is desired to use the salt, for example, and the salt is closed off, as in Fig. 4, the user may grasp the pepper cover 33 and push it toward the pepper cap in which case the pepper cover will be sprung and spring held against the pepper cap. In this condition the salt may be shaken from the salt shaker without any pepper being shaken from the pepper shaker, as shown in Fig. 1. If it is then desired to use pepper the user may grasp the salt cover and swing it toward the salt cap, as shown in Fig. 4, in which case the salt cover 32 will be sprung and be spring held against the salt cap. In this condition the pepper may be shaken from the pepper shaker without any salt being shaken from the salt shaker. It will be understood that the concavity of the cover 32 or 33, as the case may be, will cause the cover to seat on the cap of the appropriate shaker so as to insure sealing off the contents of the shaker.

In case it is desired to use the holder to shake out both salt and pepper at the same time this may be accomplished. All that is necessary is to swing the closure element to the position shown in dotted lines in Fig. 1, in which case the Y-shaped closure element will be in relatively vertical position so that the contents of both shakers may be shaken at the same time.

It will be understood that because of the enlargements 30 on the bow spring the spring will be retained in place in the slots in the ears. It will also be understood that when the closure element is oscillated from one side to the other the locking lug 36 will ride transversely of the spring 29 and depress the same increasingly until dead center is reached and thereafter the spring will force the lug to ride on the other side of the spring and will lock the closure element against the appropriate cap member. It will be understood that the rounded lower surface 37 of the locking lug 36 will permit the closure element to ride easily upon the spring.

It will be understood that although I have shown a holder made in three pieces my invention is not limited to the device, as shown, in this form. It will also be understood that the invention may be used with various other condiments or entirely different substances. It will also be understood that although I have shown the same made of certain materials for the purposes of illustration that the device is not to be limited to these materials.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A holder for containers of the kind described said holder comprising as integral structure having side recesses forming corner legs for supporting the containers in spaced relation to a horizontal support and having a top plate element and apertures in said plate element whereby containers having reduced neck portions forming shoulders are adapted to be supported by said plate element by engagement of said neck portions upwardly through the apertures with the shoulders engaging the bottom of the plate element and clamped by caps on the neck portions, said holder being provided with means for closing off one or the other of said containers, said means including a spring held closure element.

2. A holder for containers of the kind described, a blank formed with flared supporting members and side recesses with intermediate finger engaging portions and an apertured top plate to receive the reduced neck portions of the containers clamped in position by closures thereon, spring operated closure means for closing one or the other of the containers, said means comprising a concave cover mounted in said holder and having a depending portion and a bow spring also mounted in said holder for engagement by said depending portion to hold the cover over either container or in an intermediate position extending angularly to uncover both.

3. A holder for containers of the kind described including a frame having flared legs and a supporting plate adapted to receive containers therein, lugs at the side of the plate and a V-shaped closure element having trunnions and pivoted in the lugs adapted for movement to cover either container or to an intermediate position extending in an inclined position at each side to uncover both containers.

4. A holder for containers of the kind described comprising a frame having an integral horizontal supporting plate and a flared wall adapted to receive containers therebeneath held against limited displacement through said supporting plate, pivot supports at the sides of the frame and plate, a flat spring held therein, and a Y-shaped cover member having pivotal engagement with said supports and adapted to frictionally engage said spring as and for the purposes specified.

5. A holder for containers of the class described comprising a blank having flared corner supports adapted to house containers inserted therebeneath and an apertured top plate adapted to receive threaded neck portions of the containers therethrough with the containers engaging the bottom of the plate, pivot lugs struck from the top plate and having triangular slots with top bearing portions, a flat spring over the plate and extending into the bottom portions of the slots with widened portions to prevent displacement thereof, a bar pivoted in the bearing portions and having a lug to engage the spring intermediately and cover members extending angularly from the bar to cover either of the containers while uncovering the other and to extend upwardly and outwardly in position to uncover both containers and form a deflector, said containers being held by caps on the neck portions thereof engaging the top of the plate.

6. A holder for containers having reduced necks forming shoulders and closures therefor, said holder having a plate element and apertures in said plate element corresponding to the cross-sectional shape of the necks and entirely surrounding the same to receive the necks of the containers therethrough with the shoulders engaging the bottom of the plate for clamping the containers in position by engagement of the closures with the necks and against the top of the plate entirely around the necks and apertures whereby the containers are adapted to be supported by said plate element.

7. A holder for containers having screw threaded necks and caps, said holder having a plate element and apertures in said plate element to receive the necks of the containers therethrough with the containers engaging the bottom of the plate element for clamping and supporting the containers in position by engagement of the caps with the top face of the plate element whereby the containers are adapted to be supported by said plate element in spaced relation to a support for the holder, said holder being provided with means for closing off either of said containers.

8. A holder for containers of the kind described having neck portions with shoulders therebeneath and caps on said neck portions, including an apertured top plate adapted to receive the neck portions only of the containers to project therethrough with said neck portions projecting above the plate and the shoulders engaged against the bottom of the plate for securing the containers in position by engagement of the caps with the top face of the plate, spring operating closure means for closing one or the other of the containers, said means comprising covers mounted in said holder and having a depending lug, and a bow spring also mounted in said holder beneath the lug and frictionally engaged thereby.

9. A holder for containers having perforated caps including a horizontal plate having openings to receive and clamp the containers, side members extending down from the plate, said plate having upstanding ears and closure plates for the containers and a spring having trunnions pivoted in the ears.

10. A holder for containers having perforated caps including a plate having openings to receive and clamp the containers, side members extending down from the plate to receive the containers therebetween, upstanding ears struck from the plate adapted to be moved outward upon pressing the side members inwardly after the containers have been removed, a spring supported on the plate between the ears and having portions seated in the latter, and closure plates for the perforated caps pivoted in the opposed ears and having a portion engaging the spring.

11. A holder for containers of the kind described including a frame having flared legs and a supporting plate adapted to receive containers, lugs at the side of the plate and closure elements having trunnions and pivoted in the lugs adapted for movement to cover either container or to an intermediate position extending in an inclined position at each side to uncover both containers.

12. A holder for containers of the kind described comprising a frame having an integral horizontal supporting plate and a flared wall adapted to receive containers therebeneath held against limited displacement through said supporting plate, pivot supports at the sides of the frame and plate, a flat spring held therein, and a cover member having pivotal engagement with said supports and adapted to frictionally engage said spring to hold the cover in open or closed positions.

13. A holder for containers of the class described comprising a blank having flared supports adapted to house containers inserted therebeneath and an apertured top plate adapted to receive threaded neck portions of the containers therethrough with the containers engaging the bottom of the plate, pivot lugs struck from the top plate and having bearing portions, a spring over the plate, a bar pivoted in the bearing portions and having a lug to engage the spring and cover members extending angularly from the bar to cover either of the containers while uncovering the other and to extend upwardly and outwardly in position to uncover either or both containers and form a deflector, said containers being held by caps on the neck portions thereof engaging the top of the plate.

EDWARD DOLAR.